United States Patent [19]

Misawa et al.

[11] Patent Number: 5,919,289
[45] Date of Patent: Jul. 6, 1999

[54] DEAERATION TANK

[75] Inventors: Kihachiro Misawa, Ninomiyamachi; Yoshio Okumoto, Toride, both of Japan

[73] Assignee: Sumitomo Heavy Industries, Ltd., Japan

[21] Appl. No.: 08/917,280

[22] Filed: Aug. 25, 1997

[30] Foreign Application Priority Data

Aug. 30, 1996 [JP] Japan ................................. 8-230157

[51] Int. Cl.⁶ .................................................. B01D 19/00
[52] U.S. Cl. ................................. 96/203; 96/204; 96/220
[58] Field of Search ........................... 95/241, 252, 245, 95/260, 262, 263; 96/179, 189, 202, 203, 204, 220

[56] References Cited

U.S. PATENT DOCUMENTS

| | | | |
|---|---|---|---|
| 2,413,102 | 12/1946 | Ebert et al. | 95/260 |
| 2,508,528 | 5/1950 | McPherson | 96/179 |
| 3,339,345 | 9/1967 | Sebald et al. | 96/180 |
| 3,344,587 | 10/1967 | Wakeman | 96/202 |
| 3,488,926 | 1/1970 | Gilman | 55/199 |
| 3,732,668 | 5/1973 | Nichols | 96/202 |
| 4,412,924 | 11/1983 | Feather | 95/263 |
| 5,207,875 | 5/1993 | Zapka | 203/11 |
| 5,308,384 | 5/1994 | Kapanen et al. | 95/260 |
| 5,310,417 | 5/1994 | Bekedam | 96/202 |
| 5,340,383 | 8/1994 | Womack | 95/263 |
| 5,405,435 | 4/1995 | Bekedam | 96/203 |
| 5,728,200 | 3/1998 | Bekedam | 95/260 |

FOREIGN PATENT DOCUMENTS

| | | |
|---|---|---|
| 015680 | 9/1980 | European Pat. Off. . |
| 417342 | 3/1991 | European Pat. Off. . |
| 646400 | 4/1995 | European Pat. Off. . |
| 2161310 | 6/1972 | Germany . |

*Primary Examiner*—Duane S. Smith
*Attorney, Agent, or Firm*—Lorusso & Loud

[57] ABSTRACT

There is disclosed a deaeration tank which can sufficiently deaerate object water, is decreased in size, and has high treatment capability. The deaeration tank includes a tank body which defines a deaeration chamber and receives object water, an air injection device disposed within the deaeration chamber for injecting air, a discharge passage for discharging object water from the deaeration chamber, and a bubble-scavenging member disposed in the discharge passage for scavenging fine bubbles contained in the object water which passes through the discharge passage. When object water is fed into the deaeration chamber, and air is injected into the deaeration chamber, thus-injected air ascends in the object water in the form of coarse bubbles and is then released from the surface of the object water. During this ascent of coarse bubbles within the deaeration chamber, through contact with the object water, coarse bubbles attract fine bubbles contained in the object water, so that the object water is deaerated. While thus-deaerated object water is passing through the discharge passage, fine bubbles, which move due to a turbulent flow of the object water or in accordance with Brownian movement, are scavenged by the bubble-scavenging member.

3 Claims, 3 Drawing Sheets

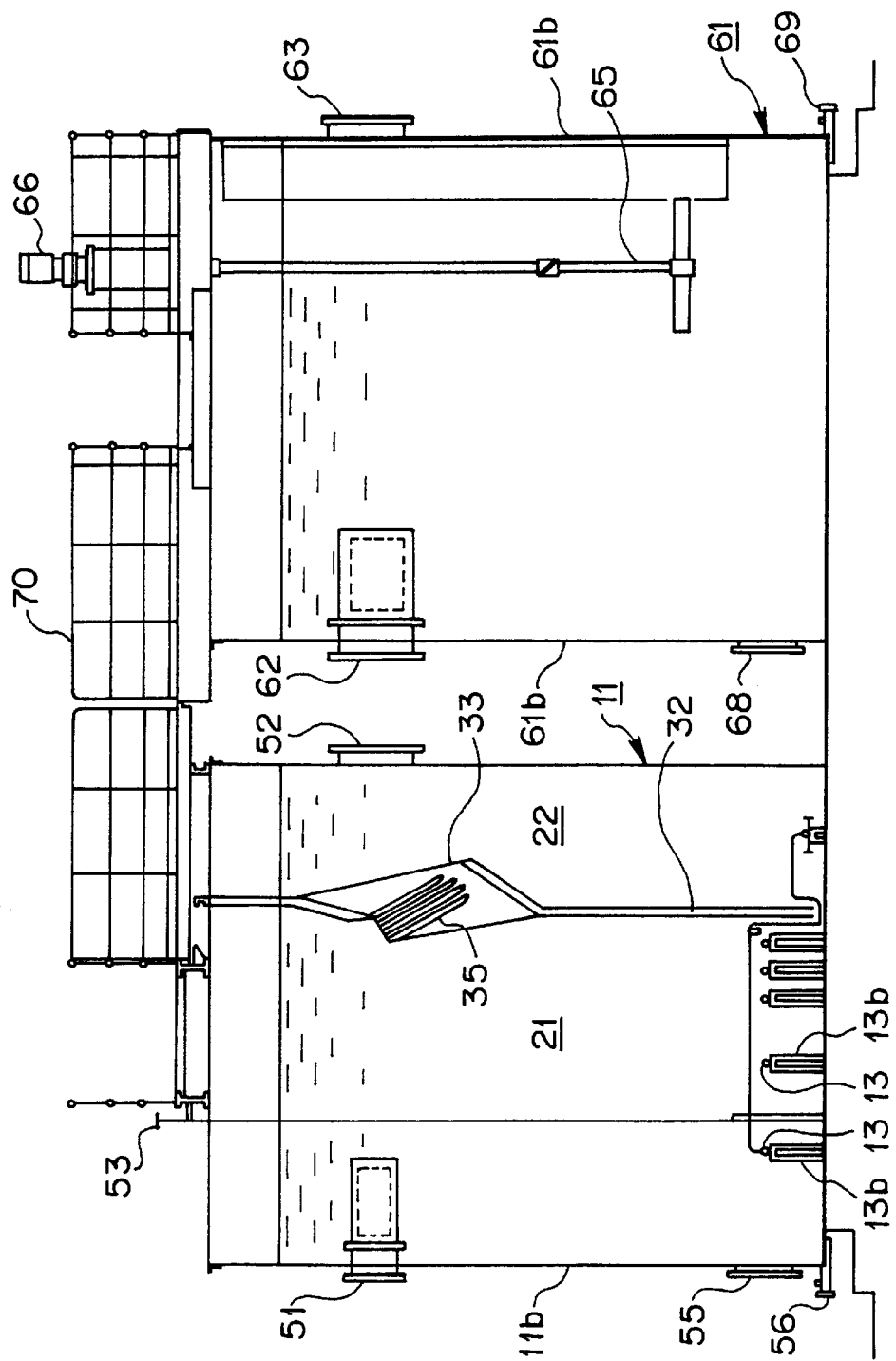

DEAERATION TANK

BACKGROUND OF THE INVENTION

1. Field of the invention

The present invention relates to a deaeration tank.

2. Description of the related art

Conventionally, in treating wastewater, i.e. object water of treatment (hereinafter merely referred to as object water), an organic coagulant is added to object water contained in a coagulating sedimentation tank so as to coagulate and settle suspended solids (SS) into sludge, which is then removed. However, when fine bubbles contained in object water adhere to the thus-formed sludge, the sludge does not settle but is suspended in the object water. As a result, the suspended sludge flows out from the coagulating sedimentation tank into a subsequent treatment tank.

Thus, in order to remove fine bubbles from the object water, various pretreatments are performed before the object water is subjected to coagulating sedimentation. Such pretreatments include a coarse bubble type deaeration method and a mechanical stirring method.

FIG. 1 is a schematic sectional view showing a conventional deaeration tank which employs the coarse bubble type deaeration method.

In FIG. 1, reference numeral 11 denotes a cylindrical or square tank body, and numeral 12 denotes a partition for dividing the tank body 11 into a deaeration section 21 and a discharge section 22. A communication opening 23 is formed between the lower end of the partition 12 and the bottom wall 11a of the tank body 11 to thereby allow communication between the deaeration section 21 and the discharge section 22. Also, a line L1 is connected to the deaeration section 21 at an upper position thereof so as to feed object water into the deaeration section 21, while a line L2 is connected to the discharge section 22 at an upper position thereof so as to discharge deaerated the object water into an unillustrated coagulating sedimentation tank. An inorganic coagulant is added to the deaeration section 21, so that polarity of SS contained in the object water is neutralized.

A nozzle 13 for injecting air into the deaeration section 21 is disposed within the deaeration section 21 in the vicinity of the bottom wall 11a. A line L3 is connected to the nozzle 13 in order to feed air thereto. A plurality of injection ports 13a are formed in the nozzle 13.

In the thus-structured deaeration tank, when object water is fed into the deaeration section 21 through the line L1, and air is fed to the nozzle 13 through the line L3, the fed air is injected into the deaeration section 21 through the injection ports 13a of the nozzle 13. Thus-injected air ascends in the object water in the form of coarse bubbles and is then released from the surface of the object water.

During this ascent of coarse bubbles within the deaeration section 21, through contact with the object water, coarse bubbles attract fine bubbles contained in the object water, so that the object water is deaerated. Thus-deaerated object water descends within the deaeration section 21 and then enters the discharge section 22 through the communication opening 23. Then, deaerated object water ascends within the discharge section 22 and is discharged into the coagulating sedimentation tank through the line L2.

However, in the above-described conventional deaeration tank, when the amount of air which has failed to become coarse bubbles is relatively large, some of the fine bubbles originally contained in object water remain intact without being attracted by coarse bubbles. As a result, the object water is not deaerated sufficiently.

Also, air which has failed to become coarse bubbles ascends in the object water at a speed slower than that of the object water descending within the deaeration section 21. Accordingly, such air, together with fine bubbles contained in the object water, descends within the deaeration section 21 following the descending flow of the object water, then enters the discharge section 22 through the communication opening 23, and is finally discharged into the coagulating sedimentation tank through the line L2.

To solve the problem, the distance between the bottom wall 11a and the nozzle 13 is made at least 500 mm longer than the distance between the bottom wall 11a and the lower end of the partition 12, or the feed rate of object water into the deaeration section 21 is reduced so as to reduce the descending speed of the object water, thereby preventing air and fine bubbles from entering the discharge section 22 together with the object water through the communication opening 23.

However, when the distance between the bottom wall 11a and the nozzle 13 is made at least 500 mm longer than the distance between the bottom wall 11a and the lower end of the partition 12, the size of the deaeration tank must be increased accordingly. Also, when the feed rate of the object water into the deaeration section 21 is reduced, the treatment capability of the deaeration tank decreases accordingly.

SUMMARY OF THE INVENTION

An the object of the present invention is to solve the above-mentioned problems in the conventional deaeration tank and to provide a deaeration tank which can sufficiently deaerate object water, is decreased in size, and has high treatment capability.

To achieve the above object, the present invention provides a deaeration tank comprising a tank body which defines a deaeration chamber and receives object water, air injection means disposed within the deaeration chamber for injecting air, a discharge passage for discharging the object water from the deaeration chamber, and a bubble-scavenging member disposed in the discharge passage for scavenging fine bubbles contained in the object water which passes through the discharge passage.

When object water is fed into the deaeration chamber, and air is injected into the deaeration chamber, thus-injected air ascends in the object water in the form of the coarse bubbles and is then released from the surface of object water.

During this ascent of coarse bubbles within the deaeration chamber, through contact with the object water, coarse bubbles attract fine bubbles contained in the object water, so that the object water is deaerated. Thus-deaerated object water is discharged through the discharge passage.

While object water is passing through the discharge passage, fine bubbles, which move due to a turbulent flow of the object water or in accordance with Brownian movement, are scavenged by the bubble-scavenging member.

Since fine bubbles contained in the object water are scavenged through use of the bubble-scavenging member, there is no need to increase the distance between the bottom wall of the tank body and the air injection means. Accordingly, the size of the deaeration tank can be reduced. Also, since the feed rate of object water into the deaeration chamber can be increased, the treatment capability of the deaeration tank increases accordingly.

In another deaeration tank of the present invention, the tank body is divided into a deaeration section and a discharge section by means of a partition, the deaeration section serving as a deaeration chamber.

In this case, object water is fed into the deaeration section, and deaerated object water is discharged from the discharge section.

In still another deaeration tank of the present invention, the discharge passage is a communication opening that is formed in the partition for connecting the deaeration section and the discharge section.

In this case, the bubble-scavenging member is disposed in the communication opening for the purpose of scavenging fine bubbles contained in the object water.

In still another deaeration tank of the present invention, the bubble-scavenging member comprises a plurality of parallel plates.

In this case, fine bubbles, which move due to a turbulent flow of the object water or in accordance with Brownian movement, are scavenged through adhesion to the surface of each plate of the bubble-scavenging member. Since the velocity of the object water is substantially zero in the vicinity of the surface of each plate, fine bubbles adhering to the plate surface are not separated from the plate surface by flow of the object water.

In still another deaeration tank of the present invention, the plates are inclined downward from the side of the deaeration section to the side of the discharge section.

In this case, scavenged fine bubbles merge to become coarse bubbles. Thus-formed coarse bubbles separate from the plates by their own buoyancy, flow into the deaeration section, and then ascend within the deaeration section.

On the other hand, suspended solids which are contained in object water together with fine bubbles coagulate into fine flocs as a result of addition of an inorganic coagulant. Because of a small difference in specific gravity between thus-formed fine flocs and the object water, fine flocs are repelled by the plates upon impingement thereon.

BRIEF DESCRIPTION OF THE DRAWINGS

The structure and features of the deaeration tank according to the present invention will be readily appreciated as the same becomes better understood by referring to the drawings, in which:

FIG. 5 is a sectional view showing a deaeration-tank/ neutralization-tank unit according to the embodiment of the present invention.

DESCRIPTION OF PREFERRED EMBODIMENT

An embodiment of the present invention will next be described in detail with reference to the drawings.

Figure 1:
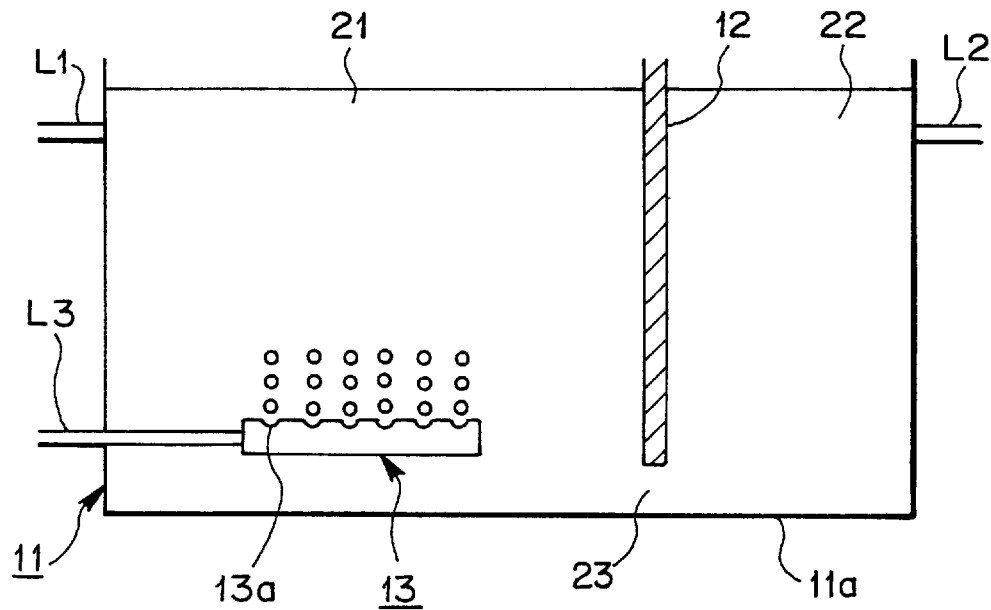
FIG. 1 is a schematic sectional view showing a conventional deaeration tank which employs a coarse bubble type deaeration method.
Figure 2:
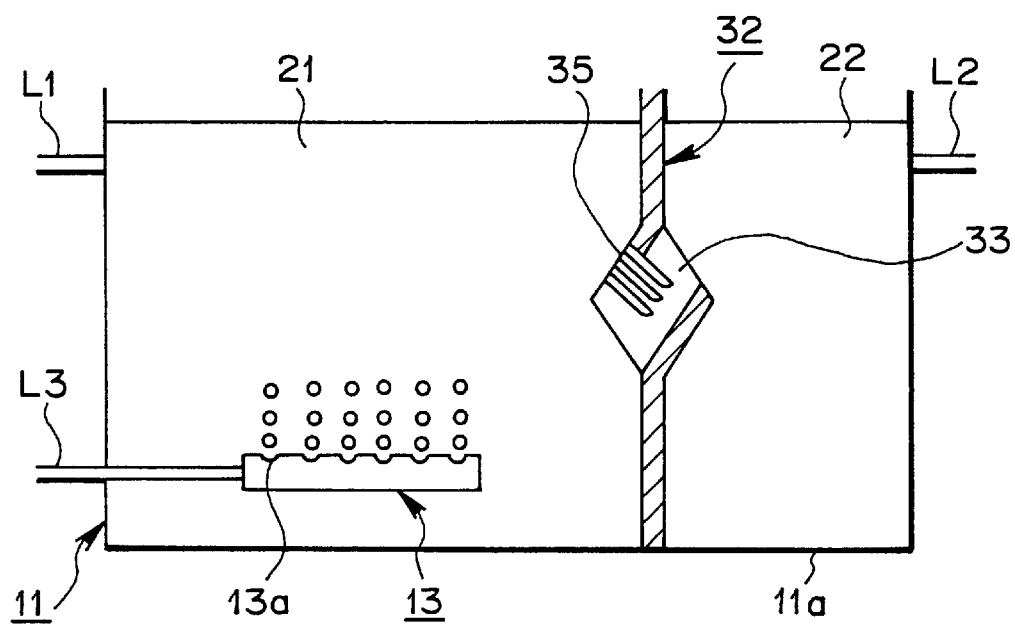
FIG. 2 is a schematic sectional view showing a deaeration tank according to an embodiment of the present invention.
Figure 3:
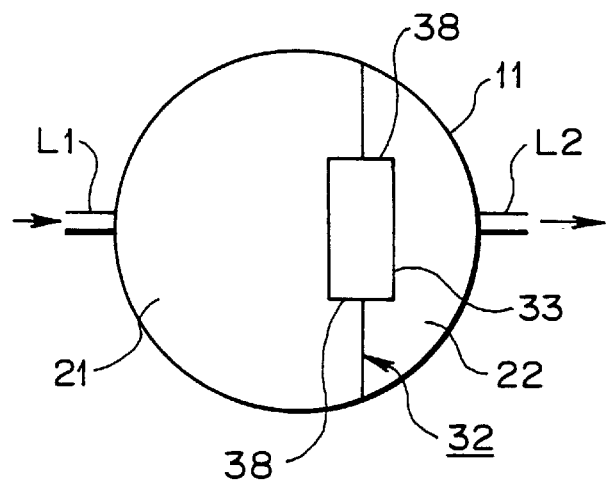
FIG. 3 is a schematic plan view showing the deaeration tank according to the embodiment of the present invention.
Figure 4:
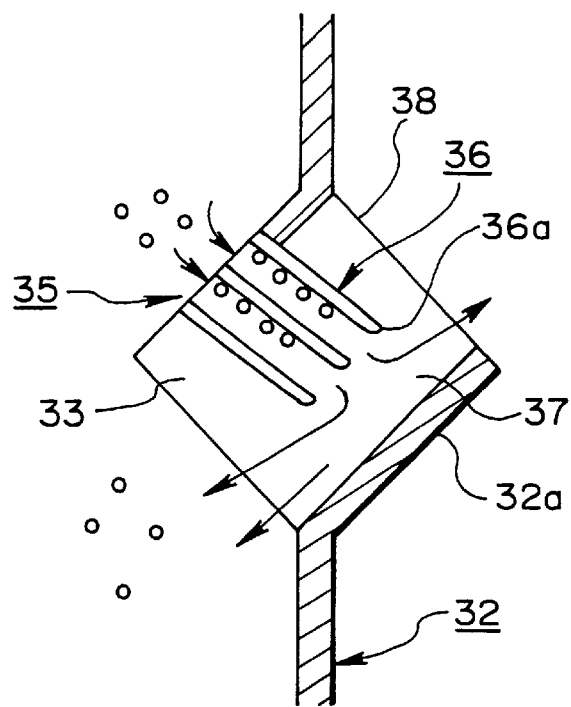
FIG. 4 is an enlarged view of a communication opening according to the embodiment of the present invention.

In FIGS. 2 to 4, reference numeral 11 denotes a cylindrical tank body, and numeral 32 denotes a partition for dividing the tank body 11 into a deaeration section 21 and a discharge section 22. The desecration section 21 defines a deaeration chamber for deaerating object water, while the discharge section 22 defines a discharge chamber for containing deaerated object water. A discharge passage, i.e. a communication opening 33 is formed in the partition 32 at a position higher than the center of the partition 32. The communication opening 33 establishes communication between the deaeration section 21 and the discharge section 22, and thus deaerated the object water is discharged into the discharge section 22 through the communication opening 33. In place of the cylindrical tank body 11, a square tank body may be used. Line L1 is connected to the deaeration section 21 at an upper position thereof for the purpose of feeding object water into the deaeration section 21, while line L2 is connected to the discharge section 22 at an upper position thereof for the purpose of discharging deaerated object water from the discharge section 22 into an unillustrated coagulating sedimentation tank. An inorganic coagulant is added to the deaeration section 21 so as to neutralize the polarity of SS contained in object water.

A nozzle 13 serving as air injection means for injecting air into the deaeration section 21 is disposed within the deaeration section 21 in the vicinity of a bottom wall 11a. A line L3 is connected to the nozzle 13 in order to feed air thereto. A plurality of injection ports 13a are formed in the nozzle 13.

In the thus-structured deaeration tank, when object water is fed into the deaeration section 21 through the line L1, and air is fed to the nozzle 13 through the line L3, the fed air is injected into the deaeration section 21 through the injection ports 13a of the nozzle 13. Thus-injected air ascends in the object water in the form of coarse bubbles and is then released from the surface of the object water.

During this ascent of coarse bubbles within the deaeration section 21, through contact with object water, coarse bubbles attract fine bubbles contained in the object water, so that the object water is deaerated. Thus-deaerated the object water passes through the communication opening 33 and enters the discharge section 22. Then, deaerated object water ascends within the discharge section 22 and is discharged into the coagulating sedimentation tank through the line L2.

In this course, air which has failed to become coarse bubbles after having been injected into the object water through the nozzle 13 ascends in the object water at a speed slower than that of the object water descending within the deaeration section 21. Accordingly, when such air, together with fine bubbles which have not been attracted by coarse bubbles, passes through the communication opening 33 following the flow of the object water, the air enters the discharge section 22, and is finally discharged into the coagulating sedimentation tank through the line L2.

To prevent this, a bubble-scavenging member 35 is disposed in the communication opening 33. The bubble-scavenging member 35 is composed of a plurality of parallel inclined plates 36 which are inclined downward from the side of the deaeration section 21 to the side of the discharge section 22. Also, a gap 37 for passing the object water therethrough is defined between a lower end portion 36a of each inclined plate 36 and a wall portion 32a which extends diagonally upward from the lower edge of the communication opening 33 in the partition 32 into the interior of the discharge section 22. Further, an end plate 38 is disposed at each side of the communication opening 33 so as to prevent a bypass of object water between the deaeration section 21 and the discharge section 22.

In this case, since the inclined plates 36 are arranged at narrow intervals with each other, object water which passes through the communication opening 33 slows down when passing between the inclined plates 36. At this time, fine bubbles, which move due to a turbulent flow of the object water or in accordance with Brownian movement, are scavenged through adhesion to the surface of each inclined plate 36. Since the velocity of the object water is substantially zero in the vicinity of the surface of each inclined plate 36, fine bubbles adhering to the plate surface are not separated from the plate surface by flow of object water. Thus-scavenged fine bubbles merge to become coarse bubbles. Thus-formed coarse bubbles separate from the inclined plates 36 by their own buoyancy, flow into the deaeration section 21, and then ascend within the deaeration section 21.

As described above, fine bubbles contained in object water can be scavenged by means of the bubble-scavenging member 35, so that there is no need to increase the distance between the bottom wall 11a and the nozzle 13. Accordingly, the size of the deaeration tank can be reduced. Also, since the feed rate of object water into the deaeration section 21 can be increased, the treatment capability of the deaeration tank increases accordingly.

On the other hand, suspended solids which are contained in the object water together with fine bubbles coagulate into fine flocs as a result of addition of an inorganic coagulant. Because of a small difference in specific gravity between thus-formed fine flocs and the object water, fine flocs are repelled by the inclined plates 36 upon impingement thereon.

The inclination of the inclined plates 36 is determined so as to facilitate separation of formed coarse bubbles from the inclined plates 36 and to prevent fine flocs in object water from accumulating on the inclined plates 36.

Next will be described a deaeration-tank/neutralization-tank unit in which the deaeration tank and a neutralization tank are combined in order to pretreat object water before it is subjected to coagulating sedimentation.

FIG. 5 is a sectional view showing the deaeration-tank/neutralization-tank unit according to the embodiment of the present invention.

In FIG. 5, reference numeral 11 denotes a tank body, numeral 13 denotes nozzles, numeral 13b denotes supports, numeral 21 denotes a deaeration section, numeral 22 denotes a discharge section, numeral 32 denotes a partition, numeral 33 denotes a communication opening, numeral 35 denotes a bubble-scavenging member, numeral 51 denotes an object water inlet to be connected with the line L1 (FIG. 2), numeral 52 denotes an object water outlet to be connected with the line L2, and numeral 53 denotes an air inlet to be connected with the line L3.

A manhole 55 and a drain port 56 are disposed on a side wall 11b of the tank body 11 at a lower portion thereof.

A neutralization tank 61 is disposed adjacent to the tank body 11. The neutralization tank 61 has an the object water inlet 62 to be connected with the line L2 and an the object water outlet 63 through which neutralized object water is discharged. In order to adjust the pH of the object water to be in a predetermined range, an acid or alkali is added to the neutralization tank 61.

A stirrer 65 is disposed within the neutralization tank 61 for the purpose of stirring object water. A motor 66 for actuating the stirrer 65 is disposed on the neutralization tank 61.

Further, a manhole 68 and a drain port 69 are disposed on a side wall 61b of the neutralization tank 61 at a lower portion thereof.

An inspection catwalk 70 is disposed on the tank body 11 and on the neutralization tank 61 so that an inspector can inspect the interior conditions of the tank body 11 and the neutralization tank 61 from above.

The present invention is not limited to the above-described embodiment. Numerous modifications and variations of the present invention are possible in light of the spirit of the present invention, and they are not excluded from the scope of the present invention.

What is claimed is:

1. A deaeration tank for treating water comprising:
    (a) a tank body which defines an interior for holding the water to be treated;
    (b) a partition mounted within said tank body and separating said interior into a deaeration section and a discharge section;
    (c) air injection means disposed within said deaeration section for injecting air into water introduced into said deaeration section;
    (d) a discharge passage in the form of an opening through said partition for discharging water from said deaeration section into said discharge section; and
    (e) a bubble-scavenging member disposed in said discharge passage for scavenging fine bubbles contained in the water by slowing water passing through said discharge passage.

2. A deaeration tank according to claim 1, wherein said bubble-scavenging member comprises a plurality of parallel plates.

3. A deaeration tank according to claim 2, wherein said plates are inclined downward from the side of said deaeration section to the side of said discharge section.

* * * * *